United States Patent [19]
Brock

[11] Patent Number: 5,400,673

[45] Date of Patent: Mar. 28, 1995

[54] AUTOMOTIVE TRANSMISSION SHIFTER AND METHOD OF ASSEMBLY

[75] Inventor: Robert D. Brock, Grand Haven, Mich.

[73] Assignee: Grand Haven Stamped Products Co., Div. of JSJ Corp., Grand Haven, Mich.

[21] Appl. No.: 11,995

[22] Filed: Feb. 1, 1993

[51] Int. Cl.⁶ .................. F16H 63/38; F16H 59/02
[52] U.S. Cl. .................. 74/475; 74/473 R; 74/538
[58] Field of Search .................. 74/473 R, 475, 501.6, 74/538

[56] References Cited

U.S. PATENT DOCUMENTS

| | | |
|---|---|---|
| 3,241,640 | 3/1966 | McCordic et al. |
| 3,941,008 | 3/1976 | Cambria ........................ 74/475 X |
| 3,994,184 | 11/1976 | Osborn ........................... 74/475 X |
| 4,126,054 | 11/1978 | Langford et al. |
| 4,326,432 | 4/1982 | Miller ............................. 74/475 |

FOREIGN PATENT DOCUMENTS

| | | |
|---|---|---|
| 57-196326 | 12/1982 | Japan . |
| 63-49764 | 4/1987 | Japan ............................. 74/475 |

Primary Examiner—Allan D. Herrmann
Attorney, Agent, or Firm—Price, Heneveld, Cooper, DeWitt & Litton

[57] ABSTRACT

A modular shifter and method of assembly is provided with components assembleable in a common direction to facilitate assembly. The shifter includes a multi-piece base adapted to attach to a vehicle, the base including a first side member and a separate second side member. Cross support pins are insert molded into one of the side members so that they extend laterally for connecting to the other side member and to space the side members apart. A lever subassembly is pivotally mounted between the side members on a pivot pin, the pivot pin being supported by the side members between the side members. A cable bracket and a detent plate are connected to the side members by the cross support pins, the cable bracket including a stabilizing flange that abuts and is welded to the detent plate to stabilize same. The lever subassembly includes pawl for engaging the detent plate and further includes cable connector for operably connecting to a shift cable. The side members, the lever subassembly, the connector bracket, the detent plate, and the pivot pin are configured to be assembled in a common direction, thus facilitating assembly.

25 Claims, 6 Drawing Sheets

AUTOMOTIVE TRANSMISSION SHIFTER AND METHOD OF ASSEMBLY

BACKGROUND OF THE INVENTION

The present invention relates generally to shifters for automotive transmissions and, more particularly, is directed to an automotive transmission shifter which is adapted to facilitate assembly.

Automotive transmission shifters are generally well-known in the prior art. These shifters normally comprise a base and a variety of parts which must be individually assembled to the base in various subassembly operations. Most shifters require that the base be repositioned several times during these subassembly operations or that the parts be assembled from multiple directions. However, this repositioning and multi-directional assembly wastes assembly time and also can add to poor quality if the parts are inaccurately oriented during a secondary operation such as welding, peening, or the like. Further, additional fixtures are often required to orient the base in each new position. Also, many shifter parts are secured in place by separate individual fastening means, thus leading to excessive assembly time and cost of assembly. Still further, the known shifters are not modular, and thus are not readily adaptable for use on different vehicle model lines.

Thus, an improved shifter and method of assembling the same for solving the aforementioned problems is desired.

SUMMARY OF THE INVENTION

In one aspect, the present invention includes a modular shifter wherein major components are assembleable in a common direction to facilitate assembly. The shifter comprises a base adapted to attach to a vehicle, the base including a first side member and a separate second side member, and interconnecting means for interconnecting the first and second side members. A lever subassembly including pawl means and cable connector means is pivotally mounted on an axis of rotation between the base by a pivot means. The construction of these parts is such that one of the first side member, second side member, and lever subassembly can be supported in a fixture and the other first side member, second side member, lever subassembly, and pivot means can be assembled thereto by moving them along the axis of rotation so as to facilitate ease of assembly. Preferably, the pivot means is initially attached to the first side member so as to extend away therefrom and provide a support on which the lever subassembly is pivoted about an axis of rotation. The lever subassembly and second side member are assembled by inserting them along the axis of rotation in one direction so that the lever subassembly is rotatable to different gear positions about said axis with the second side member supporting the end of the pivot means opposite the first side member. In a narrower aspect, the shifter includes a detent plate and also a cable bracket both of which are assembled to the base by inserting them in the same common direction over an interconnecting means in a modular arrangement. Therefore, the method of assembling the shifter includes assembling various shifter components in a common direction.

The present invention offers several advantages over known art. The illustrated embodiment can be assembled in one orientation with all major parts being added from one direction, thus reducing wasted assembly time by eliminating the need to repeatedly reorient the shifter during assembly. Further, one assembly person using one simple fixture can efficiently and successfully assemble a complete shifter if desired. Still further, two cross support pins and also a pivot pin secure the major shifter components together and also pivotally secure the shifter lever subassembly to the shifter base without the need for additional independent fastening means for each component. Additionally the modularity of the shifter permits flexibility of use and design, and permits commonization of several parts for different vehicle model lines.

These and other features, advantages and objects of the present invention will be further understood and appreciated by those skilled in the art by reference to the following specification, claims and appended drawings.

DETAILED DESCRIPTION OF THE PREFERRED EMBODIMENT

A modular shifter 20 (FIGS. 1–3) embodying the present invention includes first and second side members 22 and 24, respectively, forming a base 21 (FIG. 2), and a lever subassembly 26 pivotally mounted between side members 22 and 24. A detent plate 28 and a cable bracket 30 are also secured to side members 22 and 24. Detent plate 28 includes notches defining different gear positions that are engageable by a pawl on lever subassembly 26. Cable bracket 30 includes a flange 176 that engages and is welded to detent plate 28 to stabilize detent plate 28 in an upright position on base 21. Components 22, 24, 26, 28, and 30 are configured to allow assembly of shifter 20 along a common direction parallel to the axis "A" about which lever subassembly 26 rotates, thus facilitating ease in assembly.

Figure 6:
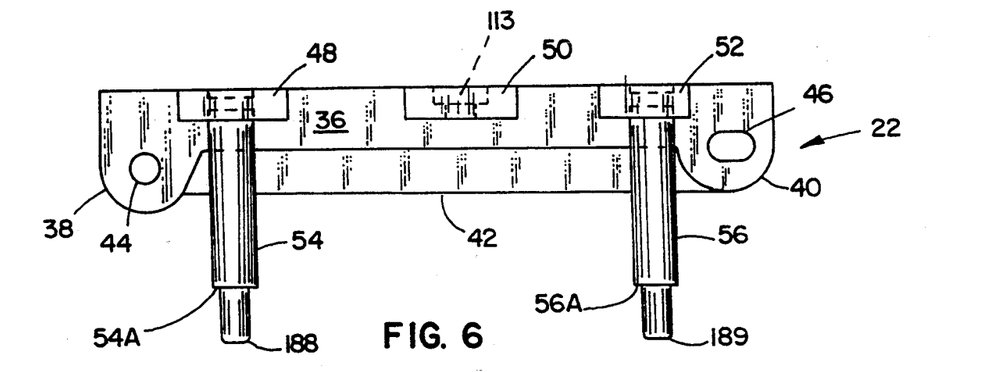
FIG. 6 is a top plan view of one of the side members shown in FIG. 3.
Figure 7:
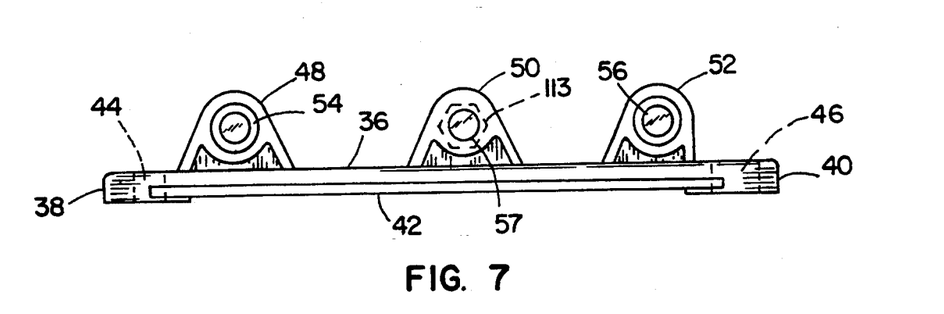
FIG. 7 is a side view of the side member shown in FIG. 6

Side member 22 (FIGS. 3 and 6–7) is a molded part made of polymeric material such as glass reinforced nylon. Side member 22 includes a planar elongated bottom section 36 with enlarged vehicle engaging attachment flanges 38 and 40 at each end, attachment flanges 38 and 40 being supported by longitudinal web 42 that extends along the side of bottom section 36. Openings 44 and 46 in attachment flanges 38 and 40 are adapted to receive bolts (not shown) to secure side member 22 to a vehicle floor panel. Three upright tabs or flanges 48, 50, and 52 extend upwardly from bottom wall section 36. The outer upright tabs 48 and 52 include cross support pins 54 and 56 which are insert molded in tabs 48 and 52 and extend laterally. Middle upright tab 50 includes an aperture 57 extending in a direction parallel to cross support pins 54 and 56 and is adapted to support pivot pin or bolt 110, as discussed below.

Side member 24 (FIGS. 3 and 9–14) is a molded part comparable to side member 22, side member 24 also being made of polymeric material such as glass reinforced nylon. Side member 22 further includes a substantially planar elongated bottom section 58 with enlarged vehicle engaging attachment flanges 60 and 62 at each end. Attachment flanges 60 and 62 include openings 66 and 68 adapted to receive bolts (not shown) that secure side member 24 to the vehicle floor. Three upright tabs or flanges 70, 72 and 74 extend upwardly from bottom wall section 58. Outer upright tabs 70 and 74 are located along the side of bottom section 58 closest to side member 22 and include apertures or pockets 76 and 78 for receiving cross support pins 54 and 56. Middle upright tab 72 is located along the remote side of bottom section 58 remote from side member 22 and includes an aperture or pocket 80 extending in a direction parallel cross support pins 76 and 78, aperture 80 being positioned in-line with aperture 57.

Figure 4:
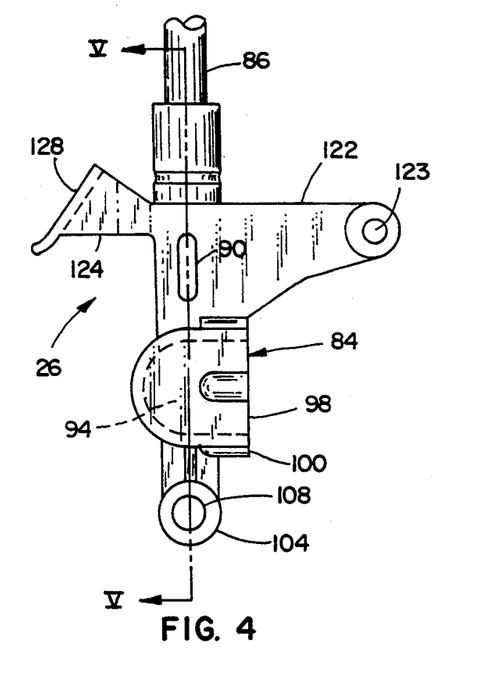
FIG. 4 is a side elevational view of the lever subassembly shown in FIG. 3.
Figure 5:
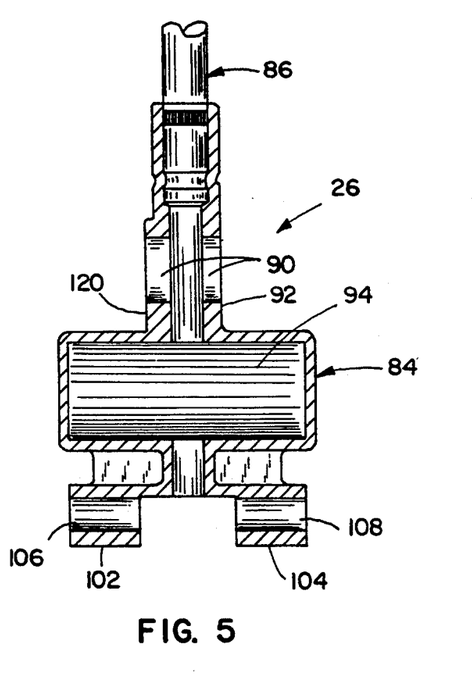
FIG. 5 is a cross-sectional view taken along the plane V—V in FIG. 4.

Lever subassembly 26 (FIGS. 3–5) includes a lower pivot-receiving structure 84 and a post 86 connected to structure 84, post 86 extending upwardly therefrom. Post 86 is tubular and includes a handle (not shown) mounted to its upper extremity, and further contains a rod-like member 88 operably mounted inside of post 86 with a pawl 90 on its lower end. Rod-like member 88 and pawl 90 are biased upwardly in a conventional fashion by a spring (not shown). However, rod-like member 88 is operably connected to a button on the handle so that by actuating the button, rod-like member 88 is slideably moved to actuate pawl 90 vertically within post 86. Pawl 90 extends laterally through a slot-like aperture 92 in pivot-receiving structure 84, the ends of slot-like aperture 92 acting to limit the travel of pawl 90. Pawl 90 extends outwardly of structure 84 so that it engages notches in detent plate 28 as discussed below. It is contemplated that pivot-receiving structure 84 can be made from a variety of materials such as plastic, aluminum, or other materials, and that pivot-receiving structure will be die cast or-molded.

Midway on pivot-receiving structure 84 (FIG. 3) below slot-like aperture 92 is a chamber 94 for receiving mechanical and electrical controls 96 (FIG. 1) for controlling the movement of pawl 90. Chamber 94 is positioned proximate pawl 90, and it is contemplated that one or more solenoid operated plungers or the like will be placed in chamber 94 along with appropriate electrical and/or electronic controls for controlling the movement of the plungers to in turn control the movement of pawl 90, chamber 94 positioning the plunger of the solenoid so that plunger locks pawl 90 in a desired position. Such mechanical/electrical devices are not the focus of the present application, and need not be described for a complete understanding of the present device. However, it is noted that, for example, recent federal regulations have required that certain conditions be met such as that the vehicle brake be depressed before a vehicle transmission can be shifted out of park, and also have required that certain conditions be met such as that the transmission shifter be locked in the park position before a vehicle ignition key can be removed. Devices for accomplishing these functions can be placed within chamber 94. Further, chamber 94 is defined with a planar front face 98 so that a plate 99 (FIG. 1) can be placed over chamber 94 to sealingly close same against the environment around shifter 20, with plate 99 potentially serving as a mounting plate for some of the mechanical/electrical devices. Attachment holes 100 are provided around face 98 for receiving screws to secure the plate 99 to face 98.

Pivot-receiving structure 84 of lever subassembly 26 still further includes a pair of downwardly extending protrusions 102 and 104. Enlargements on the lower end of protrusions 102 and 104 include laterally extending aligned apertures 106 and 108, respectively. Aligned apertures 106 and 108 are positioned so that they align with upright tab apertures 57 and 80. Bushings 109 are inserted into apertures 106 and 108 for additional durability and to reduce friction upon assembling pivoting lever subassembly 26 to side members 22 and 24 with pivot pin 110 and tubular spacer 186. A pivot-forming bolt or pivot pin 110 is extended through first side member center tab aperture 57. A tubular spacer 186 is then placed on pivot pin 110 and both are extended through bushings 109 located in aligned apertures 106 and 108, and through second side member center aperture 80 to pivotally mount lever subassembly 26 to base 21. Bolt 110 includes a hexagonal head 112 adapted to mateably engage the hex-shaped inlet 113 to aperture 57, and further includes a threaded end adapted to receive a locking hex nut 114 to secure bolt 110 in position.

Figure 1:
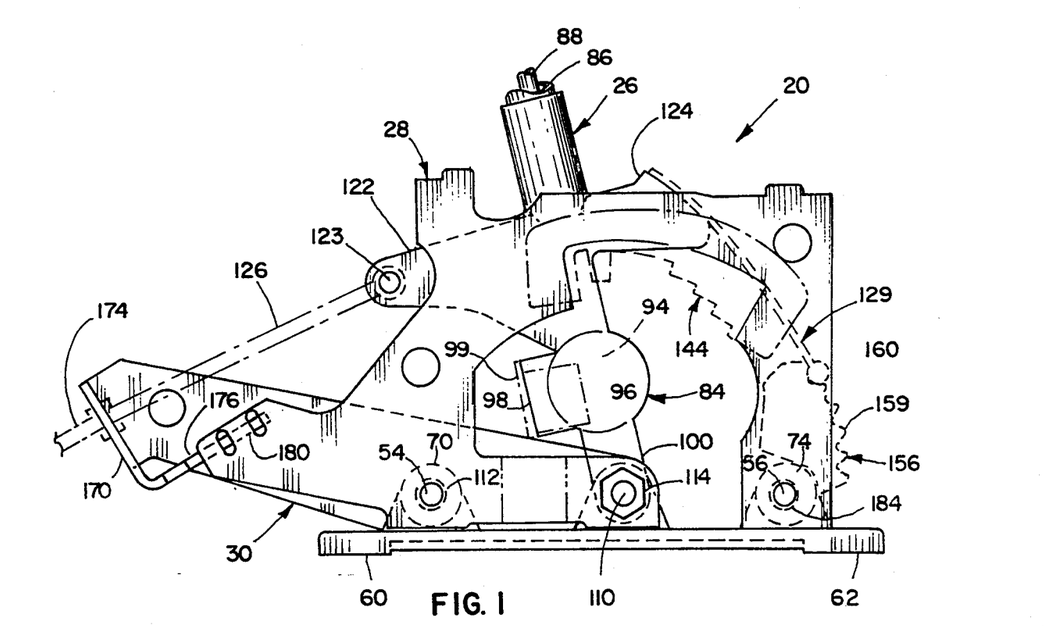
FIG. 1 is a side elevational view of a shifter embodying the present invention.
Figure 2:
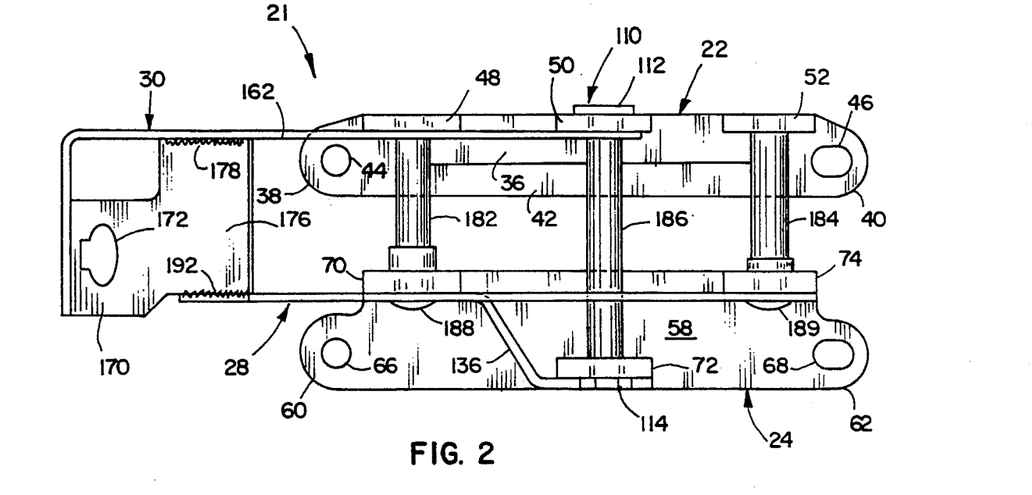
FIG. 2 is a top plan view of the shifter shown in FIG. 1 but with the lever subassembly removed for clarity.

An elongated bracket 120 (FIG. 3) is preferably cast as part of structure 84 opposite slot-like aperture 92, bracket 120 including opposing legs 122 and 124 extending laterally outwardly from lever subassembly 26. Leg 122 includes a multi-directional cable connector 123 for connecting to a transmission actuating cable 126 (FIG. 1). Leg 124 (FIG. 3) includes a flange 128 for attaching a "feel positioner" 129 to the lever subassembly 26, feel positioner 129 giving an operator an improved feel for each gear shift position as lever subassembly 26 is shifted between gear positions.

Figure 15:
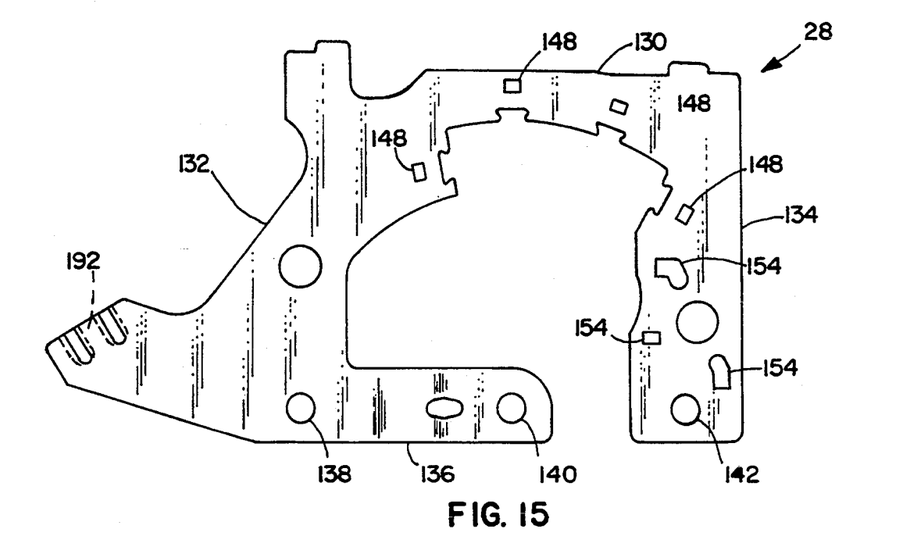
FIG. 15 is a side elevational view of the detent plate shown in FIG. 3.
Figure 16:
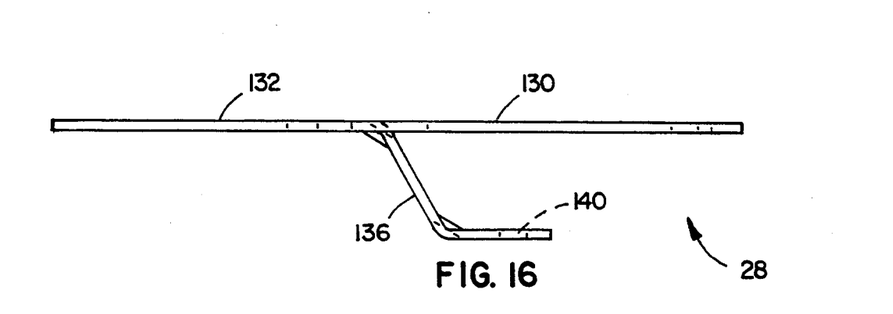
FIG. 16 is a top plan view of the detent plate shown in FIG. 15.

Detent plate 28 (FIGS. 3 and 15–16) has an inverted U-shape and is a substantially planar part made of sheet metal. In particular, detent plate 28 includes a center section 130 and downwardly extending legs 132 and 134. The lower end of leg 132 includes an offset flange 136, with the bottom of leg 132, offset flange 136, and leg 134 engaging the outer surfaces 70A, 72A and 74A of tabs 70, 72 and 74, respectively, on side member 24. Apertures 138, 140 and 142 are located in bottom of leg 132, offset flange 136, and leg 134, respectively, and align with tab apertures 76, 80, and 78.

A notch-forming or detent element 144 (FIG. 3) is attached to center section 130, notch-forming element 144 protruding downwardly below center section 130 and including hook-like protrusions for engaging apertures 148 in center section 130 to secure element 144 to center section 130. Notch-forming element 144 includes a lower surface 150 that defines a plurality of gear shift positions such as park, reverse, neutral and drive. With detent plate 28 assembled to the base, notch-forming element 144 is positioned adjacent pawl 90 of lever subassembly 26, and is engageable by pawl 90 to control lever subassembly 26 as it is moved between the gear positions. Leg 134 is also configured with apertures 154 for receiving a feel positioner element 156. Feel positioner 129 includes a leaf-spring-like body 158 that is attached to flange 128 on bracket 120 on lever subassembly 26, and further includes a roller 160 operably connected to the end of leaf-spring-like body 158 for engaging an undulated surface 159 on feel positioner element 156. This arrangement gives a more aesthetic feel to an operator moving lever subassembly 26 between gear shift positions.

Figure 8:
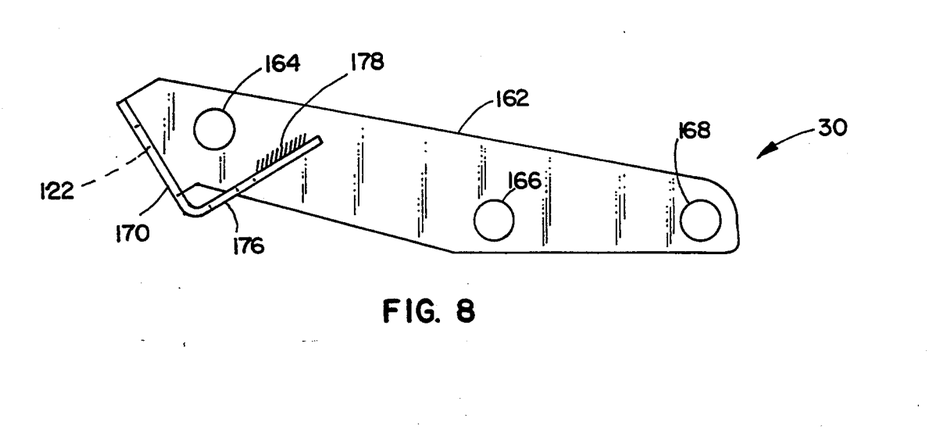
FIG. 8 is a side view of the cable bracket shown in FIG. 3.
Figure 9:
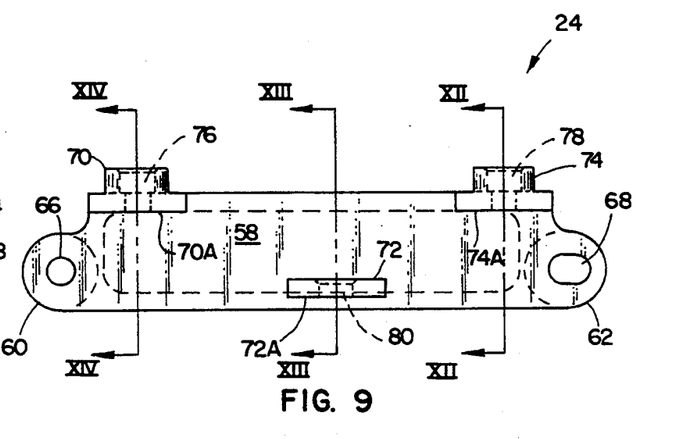
FIG. 9 is a top plan view of the other side member shown in FIG. 3.
Figure 10:
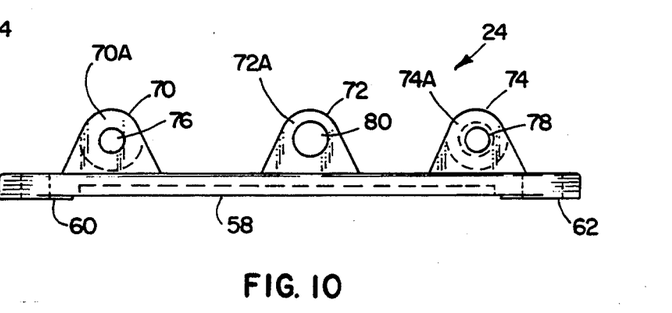
FIG. 10 is a side elevational view of the second side member shown in FIG. 9.
Figure 11:
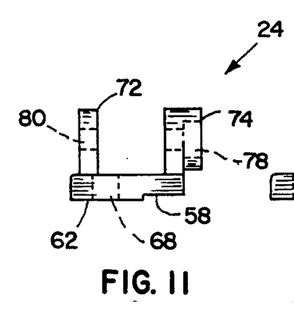
FIG. 11 is an end view of the side member shown in FIG. 10.
Figure 12:
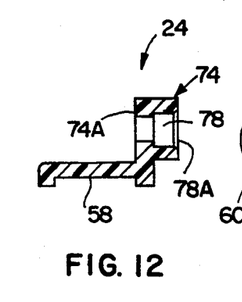
FIGS. 12–14 are cross-sectional views taken along the planes XII—XII, XIII—XIII and XIV—XIV respectively in FIG. 9.
Figure 13:
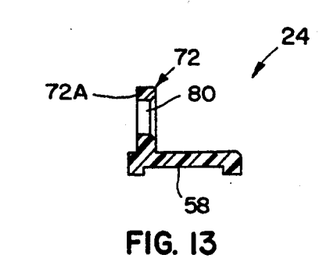
Figure 14:
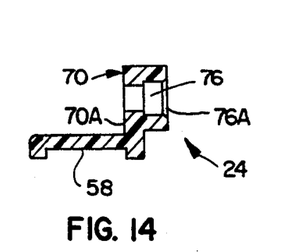

Cable bracket 30 (FIGS. 3 and 8) includes a planar body 162 with apertures 164, 166 and 168 formed therein, apertures 166 and 168 aligning with cross support pin 54 and center aperture 57 respectively. A connector flange 170 extends laterally from one end of planar body 162, connector flange 170 including a shaped aperture 172 adapted to matingly securely receive a cable conduit 174 (FIG. 1), cable conduit 174 being adapted to operably telescopingly receive transmission actuating cable 126 and forming with cable 126 an elongated shifting member. A reinforcement flange 176 (FIG. 3) extends inwardly from connector flange 170. The inner edge 178 of reinforcement flange 176 is welded to planar body 162 to increase the rigidity of cable bracket 30. The edge 180 opposite inner edge 178 of reinforcement flange 176 is welded to detent plate 28 after assembly to form a welded joint which stabilizes and secures detent plate 28 in an upright square position on shifter 20.

Side members 22 and 24 are secured together in a spaced condition in the following manner. Cross support pins 54 and 56 extend from side member 22 into engagement with side member 24. In particular, cross support pins 54 and 56 include shoulders 54A and 56A (FIG. 3) that matingly fit into the enlarged end 76A and 78A of pocket/apertures 76 and 78 (FIGS. 12 and 14), and further include reduced diameter ends 188 and 189 respectively that extend mateably through second side member apertures 76 and 78, and through detent plate apertures 138 and 142. Also, tubular spacer 186 extends through bushings 90 and aperture 80 in side member tab 72. Thus, tubular spacer 186 abuts the material forming aperture 168 in bracket 30 at one end and abuts the material forming aperture 140 in detent plate flange 136 at the other end. With detent plate 28 engaging the outer edge of tabs 70, 72 and 74 on side member 24, the ends of 188 and 189 of cross support pins 54 and 56 extend through apertures 0138 and 142. These ends 188 and 189 are peened over such as by orbital or spin riveting to secure shifter 20 together. Also, a hex nut 190 is placed on pivot pin 110. Further, a weld bead 192 secures cable bracket 30 to detent plate 28.

METHOD OF ASSEMBLY

Having described the components and interrelationships of components, the assembly, operation and advantages of the present device will be apparent to a person of ordinary skill in the art. Shifter 20 is assembleable in a number of different sequences, a preferred one of which is described below.

Initially pivot pin 110 is inserted into side member 22 in a direction parallel said cross support pins 54 and 56. Then side member 22 is put into a fixture. Cable bracket 30 is then inserted over cross support pins 54 and 56 and pivot pin 110. Tubular spacer 186 and lever subassembly 26 are then assembled in sequence onto the pivot pin 110. Side member 24 and detent plate 30 are then inserted in sequence over the reduced diameter ends of cross support pins 54 and 56 and pivot pin 110, after which the ends 188 and 189 of cross support pins 54 and 56 are peened over to secure the assembly together. Also, nut 190 is attached to the end of pivot pin 110. After being assembled, cable bracket 30 is welded to detent plate 28 along weld bead 192 to stabilize detent plate 28 in its upright condition.

Notably, all of the aforementioned parts can be added from one direction, which direction is parallel to the axis of rotation "A". This facilitates ease in assembly, and eliminates the need for repeated repositioning of shifter 20 during assembly. Also, each of the parts are modular in nature so that particular parts can be replaced with other parts thus facilitating repair, and different parts can be selected for original assembly thus allowing a modular build readily adaptable for different car lines while still using a maximum of common parts.

MODIFICATION

Figure 17:
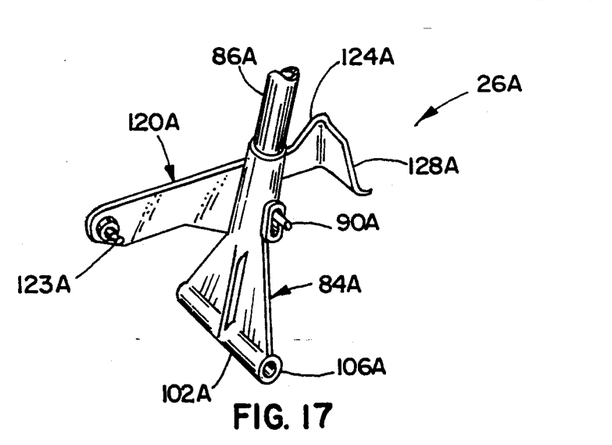
FIG. 17 is a perspective view of a modified lever subassembly, the modified lever subassembly also being useable in the shifter illustrated in FIGS. 1–3.

The modularity of shifter 20 not only facilitates assembly, but also permits substitution of parts so as to allow design flexibility and commonization of the remaining parts. For example, in FIG. 17, there is shown a modified lever subassembly 26A which can be substituted for lever subassembly 26 in shifter 20. Lever subassembly 26A includes a triangularly-shaped pivot-receiving structure 84A including a downwardly extending protrusion 102A with aperture 106A, aperture 106A having a diameter sufficient for receiving spacer 186 and nyliner bushings 109. The remaining parts of lever subassembly 26A are substantially identical to lever subassembly 26.

Similarly, a different notch forming element can be substituted for notch forming element 144, such as to achieve different throws as required by different transmissions. Notably, each of parts 22, 24, 26A, 28 and 30 (and 144 and 156) are modular and hence the overall modularity of the design permits ready substitution and design flexibility.

Figures 3, 18:
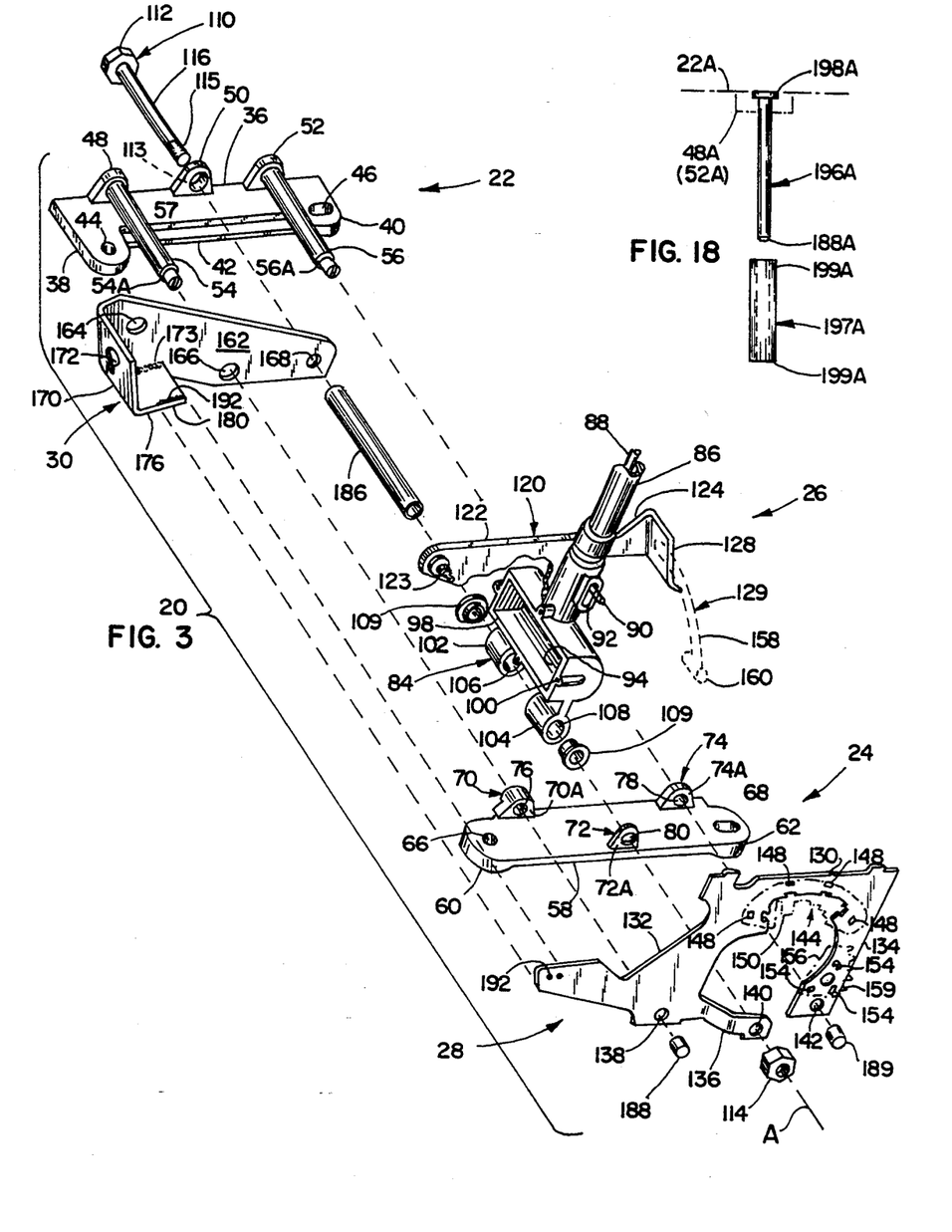
FIG. 3 is an exploded perspective view of the shifter shown in FIG. 1.
FIG. 18 is a side view of a modified cross support pin.

A second embodiment cross support pin 190A is shown in FIG. 18. Rather than insert molding cross support pins 54 and 56 into side member 22, it is contemplated that a pair of bolt-like cross support pins 196A with tubular spacers 197A can be used. The arrangement would be comparable to the way in which bolt 110 and spacer 186 interconnects side members 22 and 24. Specifically, bolt-like cross support pins 196A would extend through holes in tabs 48A (and 52A) with pin heads 198A engaging the material forming the holes in tabs 48A (and 52A). One pin 196A would extend through aperture 166A in bracket 30, through aperture 70 in tab 70 of side member 24, and through aperture 138 of detent plate 28. Tubular spacer 197A would be positioned on pin 196A with one of the spacer ends 199A abutting the material forming aperture 166 in bracket 30 and the other end abutting the material forming the aperture 76 in tab 70. The other pin 196A would be extended through an aperture in tab 52A and through aperture 78 in tab 74, with the second spacer 197A engaging and spacing apart tabs 52A and 74, and thus spacing apart side members 22A and 24.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A modular shifter comprising:
   a base adapted to attach to a vehicle including a first side member and a separate second side member;
   interconnecting means extending between said first and second side members for interconnecting and supporting said first and second side members;
   a lever subassembly including pawl means and further including connector means for operably connecting an elongated shifting member to said lever subassembly;
   pivot means for pivotally mounting said lever subassembly between said first and second side members so that said lever subassembly is movable to at least one gear shift position, said pivot means extending between said first and second side members and pivotally supporting said lever subassembly about an axis of rotation, said first and second side members and said lever subassembly including surfaces configured to mateably engage said interconnecting means and said pivot means as said first and second side members and said lever subassembly are moved along said axis of rotation to their assembled positions wherein said lever subassembly is sandwiched between first and second side members;
   means for securing said pivot means, lever subassembly and first and second side members in their assembled position;
   a detent plate with notch means disposed on said detent plate, said notch means corresponding to said at least one gear shift position and being engageable by said pawl means to limit the movement of said lever subassembly, said detent plate being configured to permit assembly thereof by moving said detent plate parallel to said axis of rotation into engagement with one of said first and second side members;
   detent plate mounting means for securely mounting said detent plate to said one of said first and said second side members, whereby said lever subassembly and said detent plate are assembleable to said one side member parallel to said axis of rotation, thereby facilitating ease of assembly; and
   a bracket adapted to receive an elongated shifter member, said bracket being configured for assembly to said base by said interconnecting means by moving said bracket parallel to said axis of rotation into engagement with the other of said first and second side members.

2. A shifter as defined in claim 1 wherein said interconnecting means includes said detent plate mounting means.

3. A shifter as defined in claim 2 wherein said interconnecting means includes cross support pins that extend through said first and second side members, said bracket, and said detent plate.

4. A shifter as defined in claim 3 wherein said pivot means includes a pivot-forming member that extends through said first and second side members of said base and also through said lever subassembly.

5. A shifter as defined in claim 3 wherein said interconnecting means includes a welded joint securing said bracket and said detent plate together.

6. A shifter as defined in claim 5 wherein said interconnecting means includes spacers on said cross support pins so that said first and second side members are spaced a predetermined distance apart upon assembly.

7. A shifter as defined in claim 2 wherein said interconnecting means includes a welded joint securing said bracket and said detent plate together.

8. A shifter as defined in claim 1 wherein said interconnecting means includes cross support pins that extend through said first and second side members and said detent plate.

9. A shifter as defined in claim 8 wherein said interconnecting means includes spacers on said cross support pins so that said first and second side members are spaced a predetermined distance apart upon assembly.

10. A modular shifter
    as defined in claim 1 wherein said pivot means includes a pivot-forming member that extends through said first and second side members of said base and also through said lever subassembly, said pivot-forming member pivotally connecting said lever subassembly to said base and also holding said first and second side members together.

11. A modular shifter
    as defined in claim 1 wherein said first side member is made of polymeric material.

12. A shifter as defined in claim 11 wherein said first side member includes at least two insert-molded cross support pins.

13. A shifter as defined in claim 12 wherein said interconnecting means includes shoulders on said cross support pin to space said first and second side members a predetermined distance apart.

14. A shifter as defined in claim 10 including spacer means positioned between said first and second side members, said spacer means spacing said side members a predetermined distance apart.

15. A modular shifter comprising:
    a base adapted to attach to a vehicle including a first side member and a separate second side member, said first and second side members comprising molded polymeric material;
    interconnecting means extending between said first and second side members for interconnecting and supporting said first and second side members;
    a lever subassembly including pawl means and further including connector means for operably connecting an elongated shifting member to said lever subassembly;
    pivot means for pivotally mounting said lever subassembly between said first and second side members so that said lever subassembly is movable to at least one gear shift position, said pivot means extending between said first and second side members and pivotally supporting said lever subassembly about an axis of rotation, said first and second side members and said lever subassembly including surfaces configured to mateably engage said interconnecting means and said pivot means as said first and second side members and said lever subassembly are moved along said axis of rotation to their assembled positions wherein said lever subassembly is sandwiched between first and second side members;

means insert molded into one of said first and second side members for securing said pivot means, lever subassembly and first and second side members together in their assembled position; and said lever subassembly including a chamber proximate said pawl means, said chamber being adapted to receive and position mechanical and electrical controls for controlling the movement of said pawl means from said notch means in said detent plate.

16. A shifter comprising:

a lever subassembly defining opposing sides and including pawl means;

a base including a first side member with a first pivot-receiving tab and a first vehicle-engaging attachment flange, and further including a separate second side member with a second pivot-receiving tab and a second vehicle-engaging attachment flange, said base further including detent means defining at least one gear position for operably receiving said pawl means;

pivot-forming means engaging said pivot-receiving tabs for pivotally mounting said lever subassembly to said base between said pivot-receiving tabs of said first and second members, said pivot-forming means also interconnecting said first and second members in a spaced condition, said lever subassembly being movable to at least one gear shift position;

fastener means for securing said first and second side members together, said fastener means cooperating with said pivot-forming means to stabilize said first and second side members and thus form said base into a rigid unit with said pivot-receiving tabs being positioned proximate said opposing sides of said lever subassembly, said first and second side members including surfaces facing said lever subassembly, said surfaces being shaped so that said first and second side members and said lever subassembly are movable along a common direction into engagement with each other to facilitate assembly;

a bracket for securing an elongated shifting member thereto;

said detent means including a detent plate positioned proximate said lever subassembly and operably engageable by said lever subassembly to define at least one of said gear shift positions; and said fastener means including cross support pins that extend through said first and second side members, said bracket, and said detent plate to interconnect same.

17. A shifter as defined in claim 16 wherein said bracket is proximate one of said side members and said detent plate is proximate the other of said side members, and said bracket and said detent plate are bonded together in at least one location to stabilize said detent plate in an upright position.

18. A shifter as defined in claim 16 wherein said pivot-forming means defines an axis of rotation and said first and second side members are moveable into engagement with said lever subassembly in a common direction that is parallel to said axis of rotation.

19. A shifter as defined in claim 16 wherein said detent means includes a detent plate with notches therein corresponding to said at least one gear shift position, wherein said pivot-forming means extends through said detent plate, and wherein said pivot-forming means cooperates with said fastener means to secure said detent plate to one of said first and second members so that said detent plate is positioned proximate said lever subassembly and said notches are engageable by said pawl means.

20. A shifter as defined in claim 16 wherein said pivot-forming means includes a bolt having a shaft that extends through said first and second side members of said base and also through said lever subassembly, said bolt including a head on one end engaging one of said first and second side members and a means on the other end extending through the other of said first and second side members for securing said bolt to said other side member.

21. A shifter as defined in claim 16 including spacer means for spacing said first and second side members a predetermined distance apart upon assembly.

22. A modular shifter comprising:

a base adapted for mounting to a vehicle including a modular first side member with a first upright tab and a separate modular second side member with a second upright tab, one of said first and second side members including means for securely interconnecting said first and second side members so that said first and second side members are securely interconnected to form a rigid unit but said tabs are spaced apart a predetermined distance, said first and second side members comprising molded polymeric material including at least one insert molded fastener for securing said first and second side members together;

modular detent means for defining gear shift positions secured to said base;

a modular lever subassembly including pawl means for engaging said detent means, said lever subassembly including a pivot-receiving structure adapted to be mateably positioned between said first and second upright flanges;

pivot means extending between said upright flanges for pivotally mounting said lever subassembly to said base, said pivot means operably engaging said pivot-receiving structure and defining an axis of rotation for said lever subassembly; and said first and second side members being constructed so as to be open with respect to said pivot-receiving structure so that said first and second side members and said lever subassembly are assembleable along a common direction, thus facilitating assembly.

23. A shifter as defined in claim 22 wherein said insert molded fastener includes insert molded cross support pins.

24. A shifter comprising:

a first side member and a second side member, said first and second side members comprising molded polymeric material;

cross support means for interconnecting said first and second side members to form a base adapted to be attached to a vehicle, said cross support means being insert molded into one of said first and second side members;

spacer means for spacing said first and second side members a predetermined distance apart;

a lever subassembly;

pivot means for pivotally mounting said lever subassembly between said first and second side members, said lever subassembly being pivotally moveable to at least one gear shift position, said first side member, said second side member, said cross support means, said spacer means, and said pivot means being assembleable along a common axis to facilitate assembly; and
a detent plate secured to said shifter by said cross support means, said lever subassembly including pawl means and said detent plate including notch means engageable by said pawl means for defining said at least one gear shift position.

25. A shifter comprising:
a first side member and a second side member;
cross support means for interconnecting said first and second side members to form a base adapted to be attached to a vehicle;
spacer means for spacing said first and second side members a predetermined distance apart;
a lever subassembly;
pivot means for pivotally mounting said lever subassembly between said first and second side members, said lever subassembly being pivotally moveable to at least one gear shift position, said first side member, said second side member, said cross support means, said spacer means, and said pivot means being assembleable along a common axis to facilitate assembly;
a detent plate secured to said shifter by said cross support means, said lever subassembly including pawl means and said detent plate including notch means engageable by said pawl means for defining said at least one gear shift position; and
a shifting member support bracket for stabilizing said detent plate in an upright position, said bracket being secured to said shifter by said cross support means.

* * * * *